(12) United States Patent  
Kawabata

(10) Patent No.: US 8,810,844 B2
(45) Date of Patent: Aug. 19, 2014

(54) WORKFLOW CONSTRUCTION APPARATUS, WORKFLOW CONSTRUCTION METHOD AND RECORDING MEDIUM

(75) Inventor: Hiroyuki Kawabata, Kawanishi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1496 days.

(21) Appl. No.: 11/847,131

(22) Filed: Aug. 29, 2007

(65) Prior Publication Data

US 2008/0055646 A1 Mar. 6, 2008

(30) Foreign Application Priority Data

Sep. 1, 2006 (JP) .................................. 2006-238375

(51) Int. Cl.
*G06K 15/00* (2006.01)
*G06F 3/12* (2006.01)

(52) U.S. Cl.
USPC ............................ 358/1.16; 358/1.1; 358/1.15

(58) Field of Classification Search
None
See application file for complete search history.

(56) References Cited

U.S. PATENT DOCUMENTS

| 7,464,333 | B2 * | 12/2008 | Yamamoto | 715/273 |
| 7,612,919 | B2 * | 11/2009 | Takahashi | 358/400 |
| 7,619,762 | B2 * | 11/2009 | Chavers et al. | 358/1.15 |
| 7,768,667 | B2 * | 8/2010 | Hino et al. | 358/1.15 |
| 7,826,101 | B2 * | 11/2010 | Yano et al. | 358/403 |
| 7,873,918 | B2 * | 1/2011 | Kawabuchi et al. | 715/837 |
| 7,920,101 | B2 * | 4/2011 | Lum et al. | 345/2.1 |
| 2004/0064786 | A1 * | 4/2004 | Ikeda et al. | 715/500 |
| 2007/0011038 | A1 * | 1/2007 | Kawabuchi et al. | 705/7 |
| 2007/0055741 | A1 * | 3/2007 | Murakami et al. | 709/217 |
| 2007/0179899 | A1 * | 8/2007 | Hase et al. | 705/59 |
| 2008/0007766 | A1 * | 1/2008 | Sasakuma | 358/1.15 |
| 2008/0030784 | A1 * | 2/2008 | Sakuraba et al. | 358/1.18 |
| 2008/0055646 | A1 * | 3/2008 | Kawabata | 358/1.16 |

FOREIGN PATENT DOCUMENTS

| EP | 1 065 618 | 1/2001 |
| JP | 2001-014389 | 1/2001 |
| JP | 2003-263541 (A) | 9/2003 |
| JP | 2004-133742 | 4/2004 |
| JP | 2005-173891 | 6/2005 |
| JP | 2005-202626 | 7/2005 |

OTHER PUBLICATIONS

Notification of Reasons for Refusal in JP 2006-238375 dated Sep. 9, 2008, and English Translation thereof.
Notification of Reasons for Refusal in JP 2006-238375 dated Apr. 22, 2008, and Translation thereof.

* cited by examiner

*Primary Examiner* — Marcus T Riley
(74) *Attorney, Agent, or Firm* — Buchanan Ingersoll & Rooney PC

(57) ABSTRACT

A workflow construction apparatus, comprising: a memory; a unit process register to store and register settings of unit processes that are workflow components classified by functions, in said memory; a constructer to construct a workflow by combining indications that each specifies one of said registered settings of unit processes; and a workflow register to store and register said constructed workflow with the indications that specify said combination, in said memory.

15 Claims, 13 Drawing Sheets

| Part | Part Used Right Before the Part | The number of times of usage |
|---|---|---|
| Document Scan | Box Image Readout | 1 |
| Image Merger | Document Scan | 2 |
| Macro M | Image Merger | 1 |
| | Document Scan | 1 |
| | Print | 1 |
| Print | Macro M | 1 |
| | Box Image Readout | 1 |
| SMB Transmission | Macro M | 1 |
| | Image Merger | 1 |
| E-mail Transmission | SMB Transmission | 2 |
| Box Image Delete | Macro M | 1 |

FIG.16

WORKFLOW CONSTRUCTION APPARATUS, WORKFLOW CONSTRUCTION METHOD AND RECORDING MEDIUM

This application claims priority under 35 U.S.C. §119 to Japanese Patent Application No. 2006-238375 filed on Sep. 1, 2006, the entire disclosure of which is incorporated herein by reference in its entirety.

BACKGROUND OF THE INVENTION

1. Field of the Invention

The present invention relates to a workflow construction apparatus that is applied for example to a MFP (Multi Function Peripheral) that is a multifunctional digital image forming apparatus, a workflow construction method, and a recording medium having a workflow construction program recorded therein to make a computer execute workflow construction processing.

2. Description of the Related Art

The following description sets forth the inventor's knowledge of related art and problems therein and should not be construed as an admission of knowledge in the prior art.

A workflow construction apparatus that constructs a workflow composed of a plurality of unit processes has been known for some time. With the conventional workflow construction apparatus, every time a workflow is constructed by a user, the workflow is stored in a memory with all the information including settings of unit processes that are components of the workflow.

However, if all the information of the respective workflows is stored in the memory by workflows, it is an issue that recording capacity of the memory is quite limited to record such a large amount of accumulated data.

More specifically, workflows created by users tend to include some common unit processes in many cases. If all the information should be stored in the memory by workflows, the duplicated settings of unit processes for different workflows are stored separately in the memory. Thus, a large amount of accumulated data would possibly surpass recording capacity of the memory.

Further, using the memory carrying all the information by workflows, every time a new workflow is needed to be constructed, users bother to construct a new whole workflow or call up an existing workflow to modify simply by replacing or adding some unit processes of the workflow. Thus, construction operations cannot be performed efficiently.

It is an art disclosed in Japanese Unexamined Laid-open Patent Publication No. 2003-263541, that a difference between a new scenario and a reusable original scenario preliminarily created is picked up, and the new scenario is defined by adding a description that is the difference, to the original scenario, when a chronological flow of operation process is defined as a scenario that is composed of a series of scenes.

However, since the difference is simply added to the original scenario according to the art disclosed in the publication above, the art cannot resolve the issues that arise when workflows are constructed, decreased available memory due to such a large amount of data and inefficient workflow construction operations.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide a workflow construction apparatus that enables not only a memory is used efficiently by preventing increase of accumulated data, but also workflow construction operations are performed efficiently, when a workflow is constructed.

It is another object of the present invention to provide a workflow construction method that enables not only a memory is used efficiently by preventing increase of accumulated data, but also workflow construction operations are performed efficiently, when a workflow is constructed.

It is yet another object of the present invention to provide a recording medium having a workflow construction program recorded therein to make a computer execute workflow construction processing.

According to a first aspect of the present invention is a workflow construction apparatus, comprising:
  a memory;
  a unit process register to store and register settings of unit processes that are workflow components classified by functions, in said memory;
  a constructer to construct a workflow by combining indications that each specifies one of said registered settings of unit processes; and
  a workflow register to store and register said constructed workflow with the indications that specify said combination, in said memory.

According to a second aspect of the present invention is a workflow construction method, comprising:
  a unit process registration step to store and register settings of unit processes that are workflow components classified by functions, in a memory;
  a step to construct a workflow by combining indications that each specifies one of said registered settings of unit processes; and
  a step to store and register said constructed workflow with the indications that specify said combination, in the memory.

According to a third aspect of the present invention is a recording medium recording a workflow construction program to make a computer execute:
  a unit process registration step to store and register settings of unit processes that are workflow components classified by functions, in a memory;
  a step to construct a workflow by combining indications that each specifies one of said registered settings of unit processes; and
  a step to store and register said constructed workflow with the indications that specify said combination, in a memory.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 16 is a table showing the number of times parts has been used right before respective parts so far;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
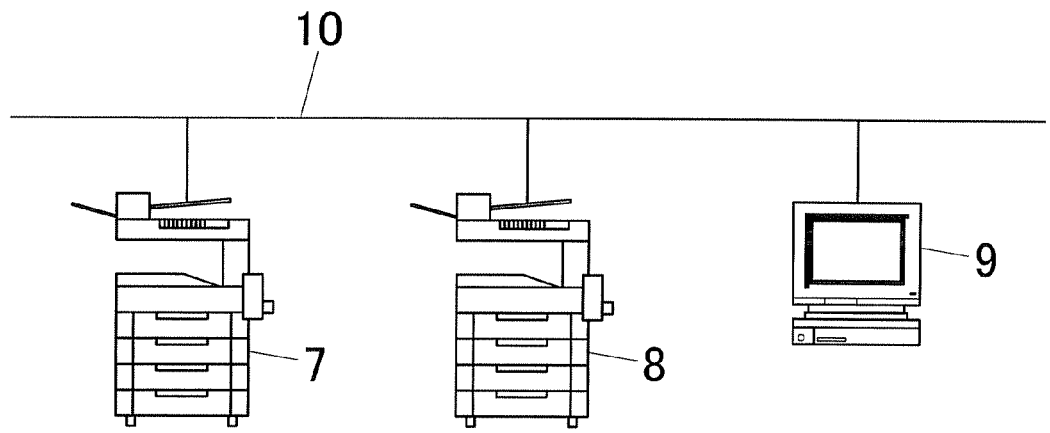
FIG. 1 is a configuration diagram showing a network system in which a MFP as a workflow construction apparatus according to one embodiment of the present invention is used.

FIG. 1 is a configuration diagram showing a network system in which a MFP is used as a workflow construction apparatus according to one embodiment of the present invention.

As shown in FIG. 1, this network system comprises a plurality of the MFPs 7 and 8, and a personal computer 9 (hereinafter, referred to as "PC") that is a user terminal, and the MFPs 7 and 8, and the PC 9 are interconnected via a network 10.

Figure 2:
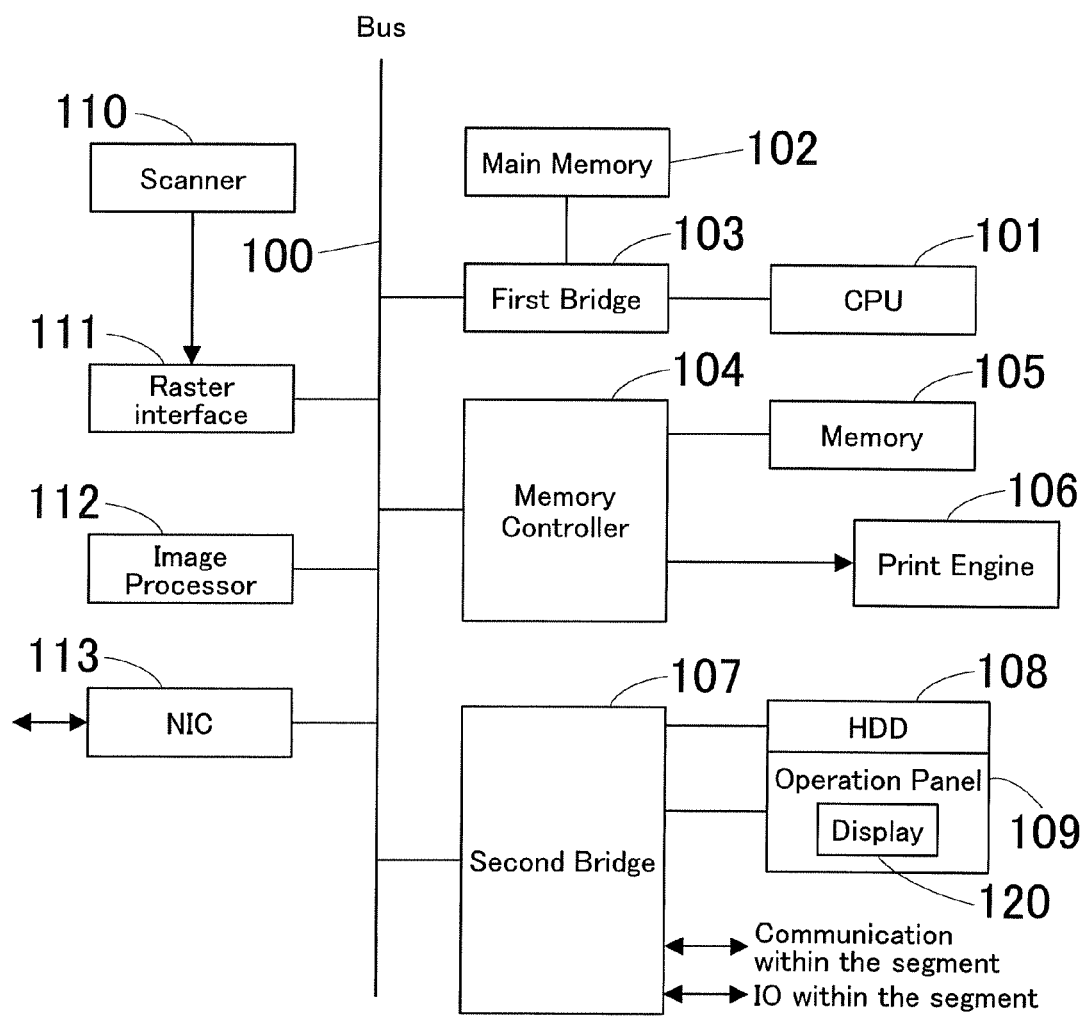
FIG. 2 is a block diagram showing an electrical configuration of the MFP.

FIG. 2 is a block diagram showing an electrical configuration of the MFP 7. Hereinafter, the MFP 7 will be explained as a representative of the MFPs, since the MFP 8 has the same configuration.

As shown in FIG. 2, the MFP 7 comprises a first bridge 103, a memory controller 104, a second bridge 107, a raster interface 111, an image processor 112 and a NIC 113, which are connected to a bus 100.

The first bridge 103 is connected to a CPU 101 and a main memory 102, and the memory controller 104 is connected to a memory 105 and a print engine 106.

The second bridge 107 is connected to a hard disk (HDD) 108 and an operation panel 109, and the raster interface 111 is connected to a scanner 110.

The CPU 101 controls the overall apparatus. Besides, the CPU 101 constructs a workflow according to an instruction given by a user on the PC 9 and others, stores and registers names of unit processes and their settings (operations) that are components of the workflow, and also stores and registers as the workflow, a combination of names of unit processes, in the HDD 108.

The main memory 102 temporarily records image data scanned by the scanner 110 and print data transmitted from the PC 9 and others via the NIC 113.

The first bridge 103 transfers data between the bus 100, and the CPU 101 and the main memory 102.

The memory controller 104 serves to have image data and others temporarily recorded in the memory 105, have image data transmitted to the print engine 106, and etc.

The print engine 106 prints image data on sheets according to specified job conditions.

The second bridge 107 transfers data between the bus 100, and the HDD 108 and the operation panel 109.

The HDD 108 records various data such as image data, programs, information of the workflows mentioned above, and unit processes of the respective workflows. In addition, it has a Box function to record image data classified in Boxes.

The operation panel 109 that comprises a display 120 using a touch panel, serves for various input operations and data display.

The scanner 110 serves as a readout unit to read out original image and others.

The raster interface 111 is an interface between the scanner 110 and the bas 100.

The image processor 112 performs predetermined image processes on acquired image data.

The NIC 113 is a network interface card to communicate data with the PC 9 and others that are connected via the network 10.

As shown in FIG. 2, with the configuration of the MFP 7, original image is scanned by the scanner 110, and the image data is routed through the raster interface 111, the bus 100 and the first bridge 103, to the main memory 102.

The image data transmitted to the main memory 102, is transferred to the image processor 112 via the bus 100, and needed image processes are performed, and then returned to the main memory 102 and stored therein.

Subsequently, the image data is routed through the memory controller 104 to the print engine 106, and it is printed on sheets.

Data transmitted from the PC 9 and others that are on the network 10, is received via the NIC 113. If it is needed to be printed, data to be printed is transferred to the main memory 102, and is scanned by the CPU 101, and then is written in the main memory 102 as bitmap data that is ready to be printed.

The generated bitmap data is transmitted via the bus 100 to the image processor 112, and needed image processes are performed, and then is transferred to the main memory 102 and stored therein as data to be printed.

Subsequently, the data to be printed is routed through the main controller 104 to the print engine 106, and is printed on sheets.

Hereinafter, it will be explained with reference to FIG. 3 to FIG. 5, to construct workflows using the MFP 7 in the network system.

Figure 3:
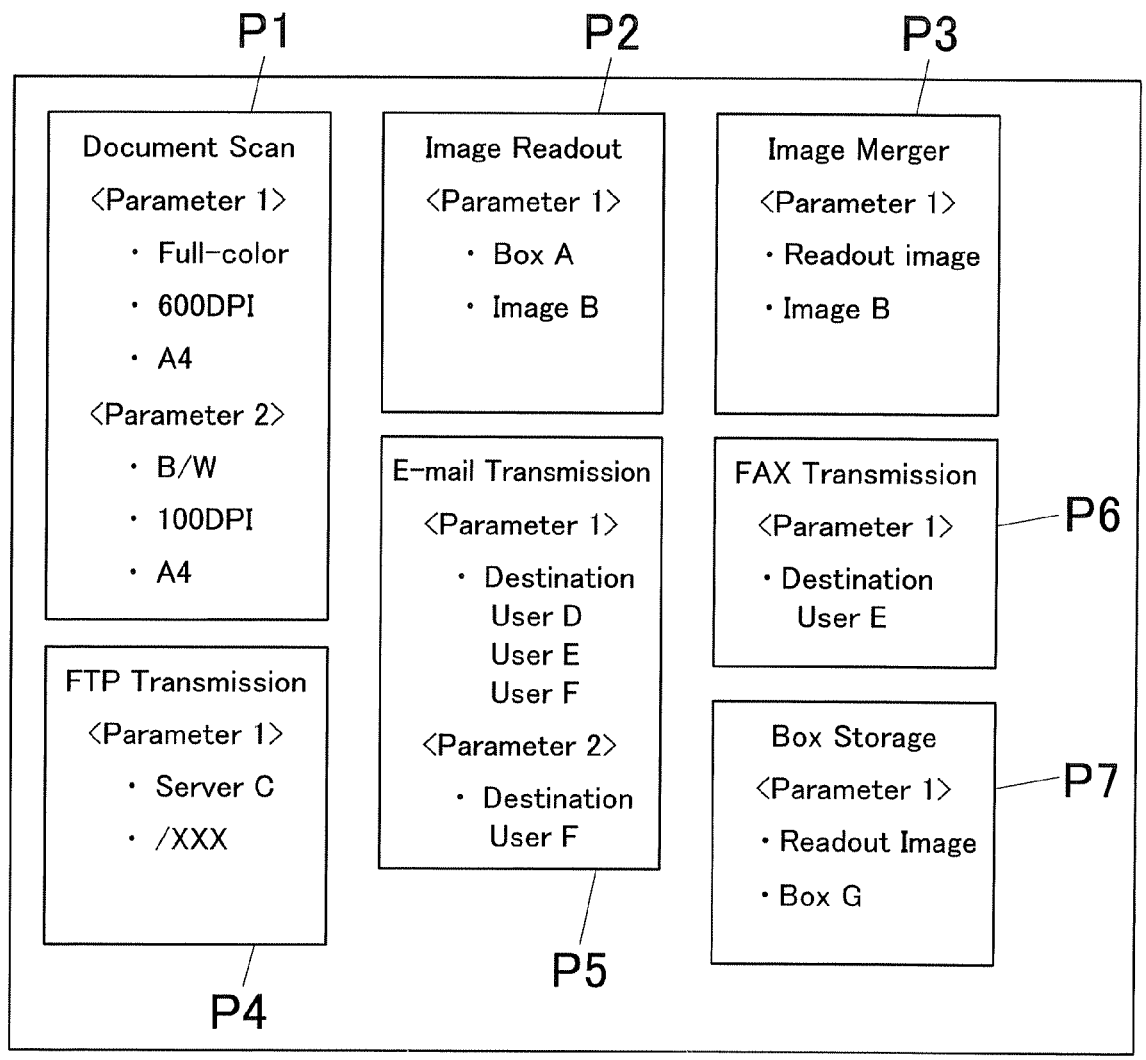
FIG. 3 is a diagram showing a list of workflows constructed and registered with indications that indicates registered settings of unit processes.

FIG. 3 shows an example of settings of unit processes, which are stored and registered in the HDD 108. The unit processes are workflow components classified by functions. Hereinbelow, unit processes are also referred to as "parts".

As shown in FIG. 3, there are seven parts P1 to P7 stored and registered. Settings of the respective parts will be explained as follows:

An document scan part P1: it is a process to scan an original document according to a predetermined parameter by the scanner 110. In this embodiment, there are parameters 1 and 2 set as parameters (process conditions).

An image readout part P2: it is a process to read out image stored in a Box. In this embodiment, there is only one set parameter 1 that indicates image B is read out from a Box A.

An image merger part P3: it is a process to merge a plurality of image. In this embodiment, there is a set parameter 1 that indicates image scanned by the scanner 110 and image B read out from a Box A are merged.

A FTP transmission part P4: it is a process to transmit image to a predetermined destination by FTP. In this embodiment, there is a set parameter 1 that indicates image is transmitted to a mail address of a server C, and stored therein.

An e-mail transmission part P5: it is a process to transmit an e-mail to a predetermined mail address. In this embodiment, there are two set parameters: the parameter 1 indicates an e-mail is transmitted to users D to F and the parameter 2 indicates an e-mail is transmitted to a user F.

A FAX transmission part P6: it is a process to transmit image to a predetermined destination by FAX. In this embodiment, there is a set parameter 1 that indicates image is transmitted to a user E by FAX.

A Box storage part P7: it is a process to store data in a specified Box. In this embodiment, there is a set parameter 1 that image scanned by the scanner 110 is stored in a Box G.

Figure 4:
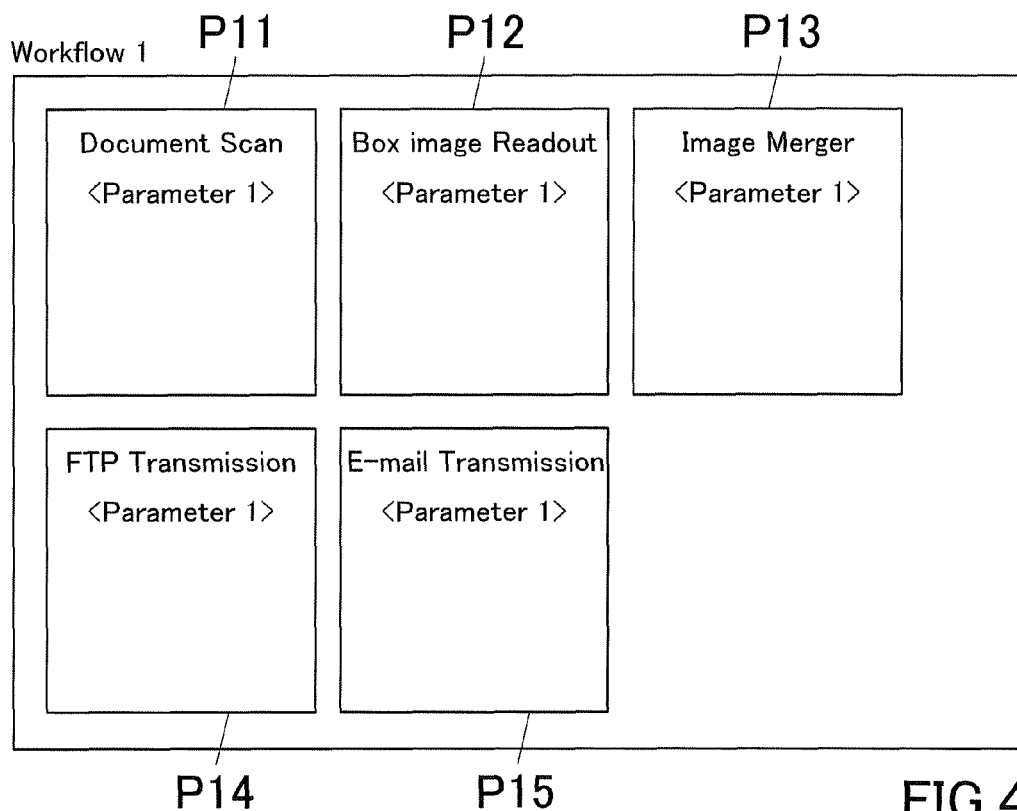
FIG. 4 is a diagram showing an example of a workflow constructed and registered with indications that indicates registered settings of unit processes.

FIG. 4 shows an example of a workflow that is constructed with parts shown in FIG. 3.

This workflow 1 that is composed of the parts P11 to P15, indicates that image scanned by the scanner 110 is merged with image B stored in the Box A, and is transmitted to the server C by FTP and stored therein, and then is transmitted to the related users D to F by e-mail. Each of the parts P11 to P15 is described by using an indication that specifies a setting of the part in FIG. 3, and the part P11 indicates P1 is executed according to the parameter 1.

Similarly, the part P12 indicates P2 is executed according to the parameter 1, the part P13 indicates P3 is executed according to the parameter 1, the part P14 indicates P4 is executed according to the parameter 1, and the part P15 indicates P5 is executed according to the parameter 1. The workflow is executed sequentially from the part P11 to P15.

Figure 5:
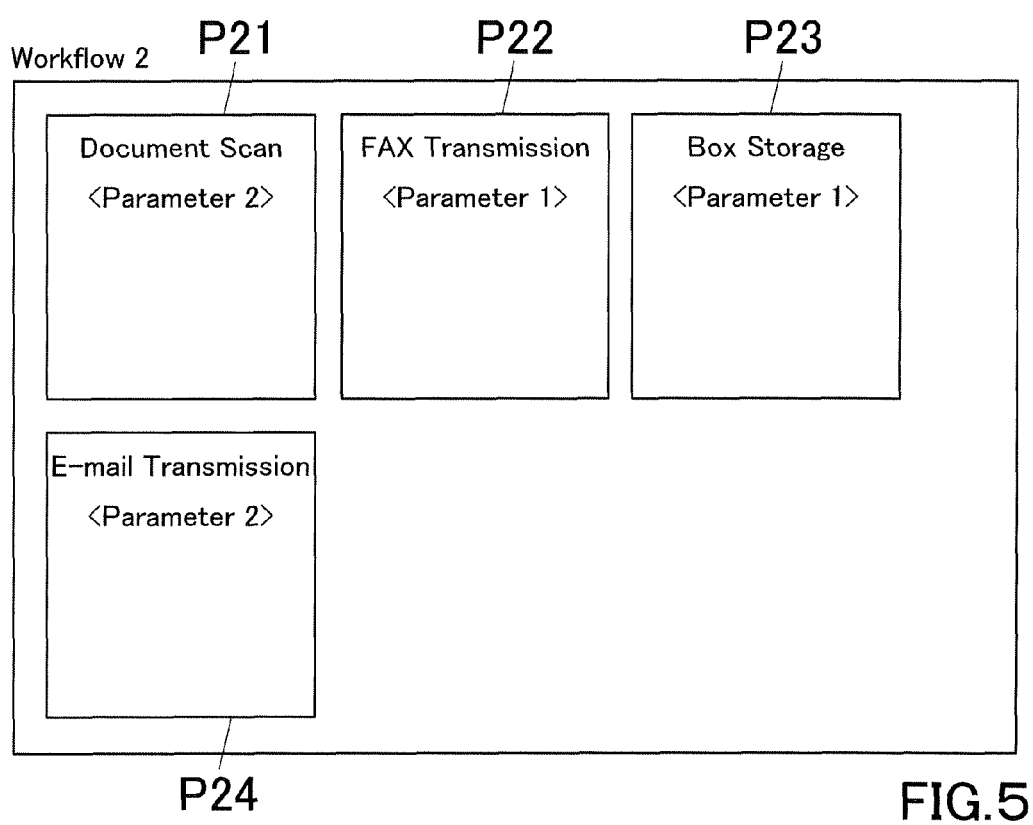
FIG. 5 is a diagram showing another example of a workflow constructed and registered with indications that indicates registered settings of unit processes.

FIG. 5 shows another example of a workflow that is constructed with parts shown in FIG. 3, and stored and registered in the HDD 108.

This workflow 2 that is composed of the parts P21 to P24, indicates that image scanned by the scanner 110 is transmitted by FAX to the user E, and is stored in the Box G for backup, and then is transmitted by e-mail to the user F.

Like in the case of FIG. 4, each of the parts P21 to P24 is described by using an indication that specifies a setting of the part in FIG. 3, and the part 21 indicates P1 is executed according to the parameter 2.

Similarly, the part P22 indicates P6 is executed according to the parameter 1, the part 23 indicates P7 is executed according to the parameter 1, and the part 24 indicates P5 is executed according to the parameter 2. The workflow is executed sequentially from the part P21 to P25.

In this way as described above, since settings of respective parts are preliminarily stored and registered in the HDD 108 and a workflow is constructed by combining indications that each specifies a setting of the part, workflow construction operations can be performed efficiently without calling out an existing workflow to modify.

In addition, since constructed workflows are stored and registered in the HDD 108 with combinations of indications, it is not needed to bother to store all the information including settings of the respective parts by workflows, and amount of accumulated data for the constructed workflows can be reduced. Thus, it can prevent available capacity of the HDD 108 from decreasing and the memory is used efficiently.

Meanwhile, the CPU 101 also serves to register automatically each combination of a plurality of parts as a macro by an indication, by analyzing the registered workflows.

Figure 6:
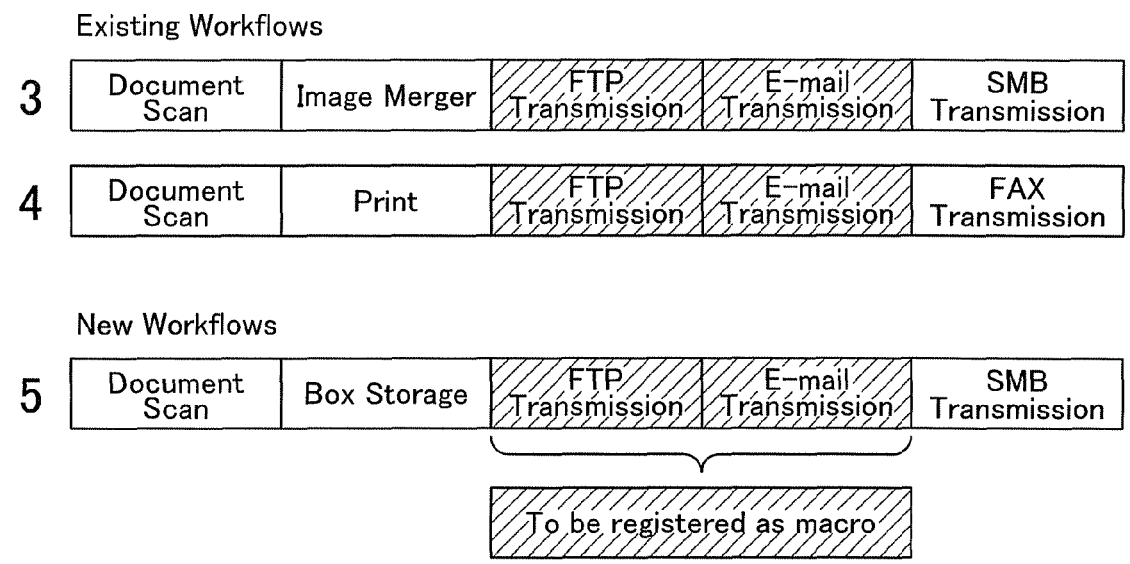
FIG. 6 is a diagram showing an example of how to register a combination of a plurality of unit processes by one indication.

For example as shown in FIG. 6, in a case where there are a workflow 3 composed of the parts of "document scan", "image merger", "FTP transmission", "e-mail transmission" and "SMB transmission", and a workflow 4 composed of the parts of "document scan", "print", "FTP transmission", "e-mail transmission" and "FAX transmission", which are already registered, if a new workflow 5 composed of the parts of "document scan", "Box storage", "FTP transmission", "e-mail transmission" and "SMB transmission" is registered, those workflows are analyzed.

As a result of the analysis, if it is judged that there are a plurality of workflows (there are three workflows in this embodiment, the workflows 3, 4 and 5) having the same combination of parts (the combination of "FTP transmission" and "e-mail transmission"), the combination is registered as a macro in the HDD 108.

Users can construct a workflow more easily by selecting a macro that is frequently used, i.e. selecting two parts all at once. Each macro to be registered may be composed of three or more parts, although one macro is composed of two parts in the embodiment above.

Hereinafter, a macro creation process that is executed by the CPU 101 will be explained with reference to the flowchart in FIG. 7.

Figure 7:
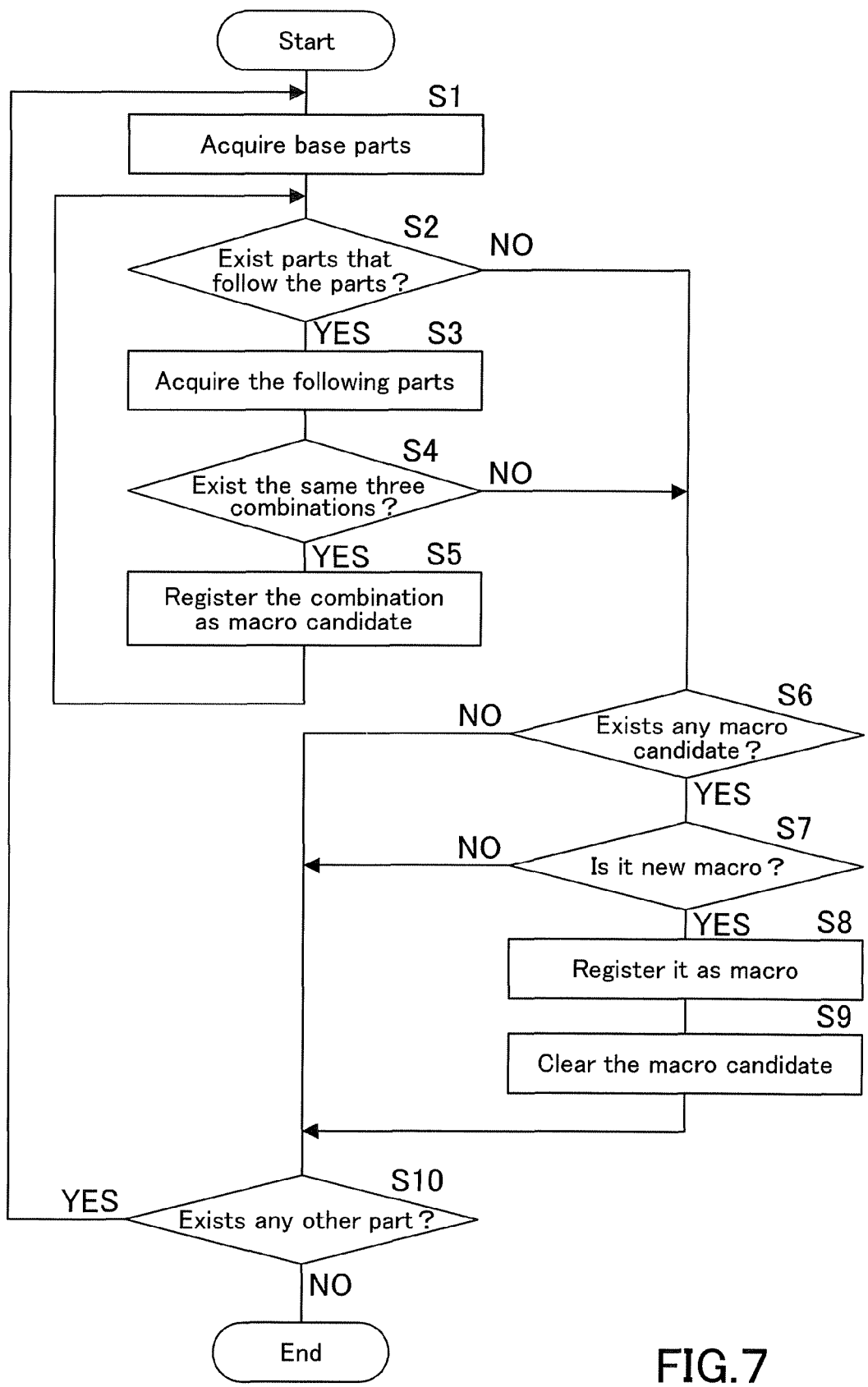
FIG. 7 is a flowchart showing a macro creation process.

As shown in FIG. 7, information of base parts is acquired in Step S1, and it is judged whether or not there is a following part in Step S2. If there is a following part (YES in Step S2), information of the following part is acquired in Step S3, and the routine proceeds to Step S4. If there is not a following part (NO in Step S2), the routine proceeds to Step S6.

In Step S4, it is judged whether or not there are the same three combinations of parts for example. If there are the same three combinations (YES in Step S4), the combination is registered as a macro candidate in Step S5, and the routine goes back to Step S2 to repeat from Step S2 to S5. If there are not the same three combinations (NO in Step S4), the routine proceeds to Step S6.

In Step S6, it is judged whether or not there is any macro candidate. If there is any macro candidate (YES in Step S6), the routine proceeds to Step S7. If there is no macro candidate (NO in Step S6), the routine proceeds to Step S10.

In Step S7, it is judged whether or not it is a new macro. If it is a new macro (YES in Step S7), it is registered as a macro in Step S8, and it is cleared from the macro candidates in Step S9, and then the routine proceeds to Step S10. If it is not a new macro (NO in Step S7), the routine proceeds to Step S10.

In Step S10, it is judged whether or not there is more part. If there is any other part (YES in Step S10), the routine goes back to Step S1. If there is no other part (NO in Step S10), the routine terminates.

Hereinafter, workflow construction operation will be explained with reference to screens to be displayed on the display 120. Display controls on the screens are performed by the CPU 101, and inputs by users from the respective screens are accepted and processed by the CPU 101.

Figure 8:
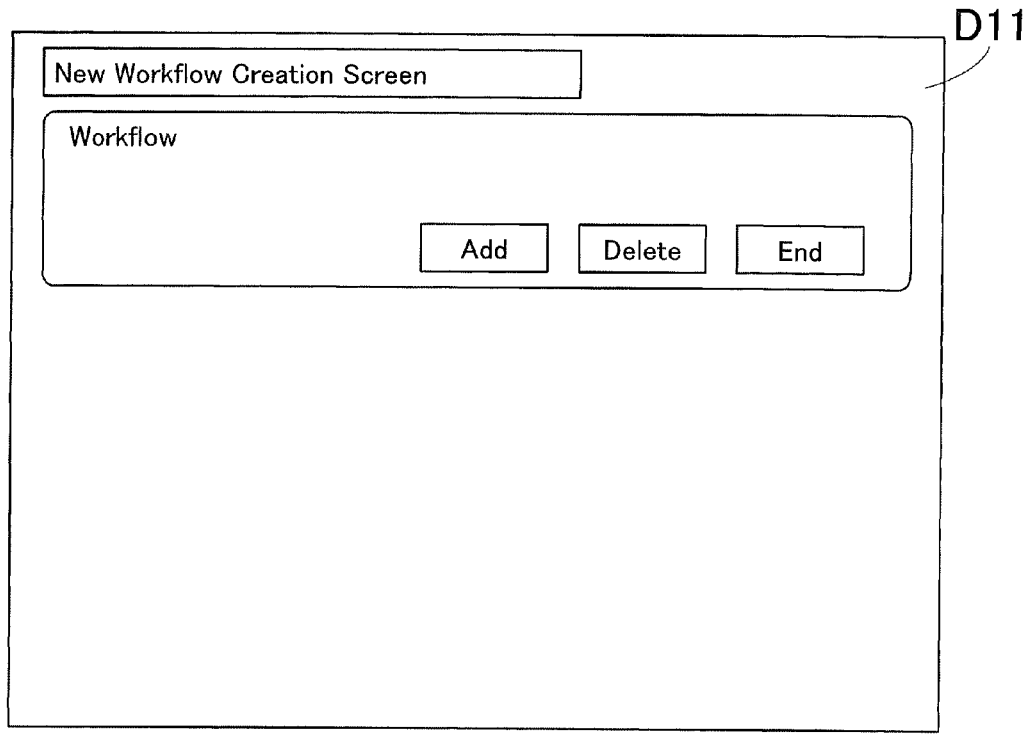
FIG. 8 is a diagram showing an initial screen for new workflow creation.

FIG. 8 shows a workflow creation screen D11.

Figure 9:
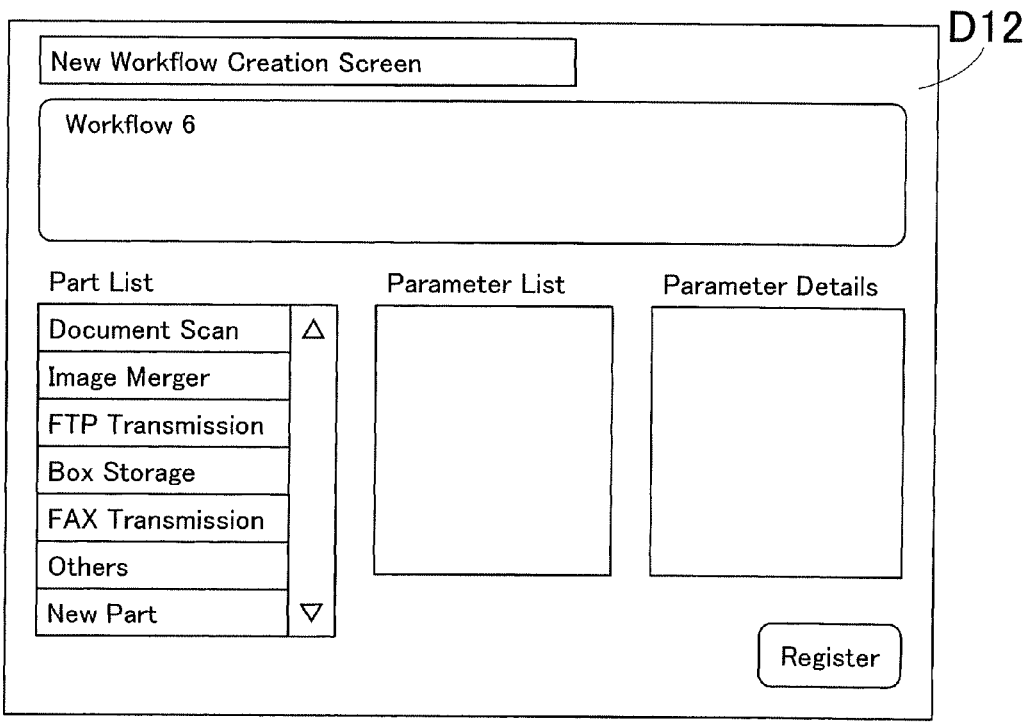
FIG. 9 is a diagram showing a part setting screen that follows the screen in FIG. 8.

If an "add" button is pressed in the workflow creation screen D11, the screen is switched to a part selection screen D12 shown in FIG. 9, and it is added as a new workflow 6. A "delete" button is pressed if a part is needed to be deleted. A workflow is recorded in the HDD 108 by pressing an "end" button after workflow creation.

As shown in the part selection screen D12, there are a "part list", a "parameter list" and a "parameter details" displayed in the lower display area. In the "part list", there are indications such as "document scan", "image merger", "FTP transmission", "Box storage" and "FAX transmission", each specifies one of the parts that are preliminarily stored and registered with the settings in the HDD 108. If an "others" button is pressed, indications of other parts are shown in a list. If a "new" button is pressed, a new part that is not yet registered in the HDD 108 can be created. The new created part is stored and registered in the HDD 108 by the CPU 101.

Figure 10:
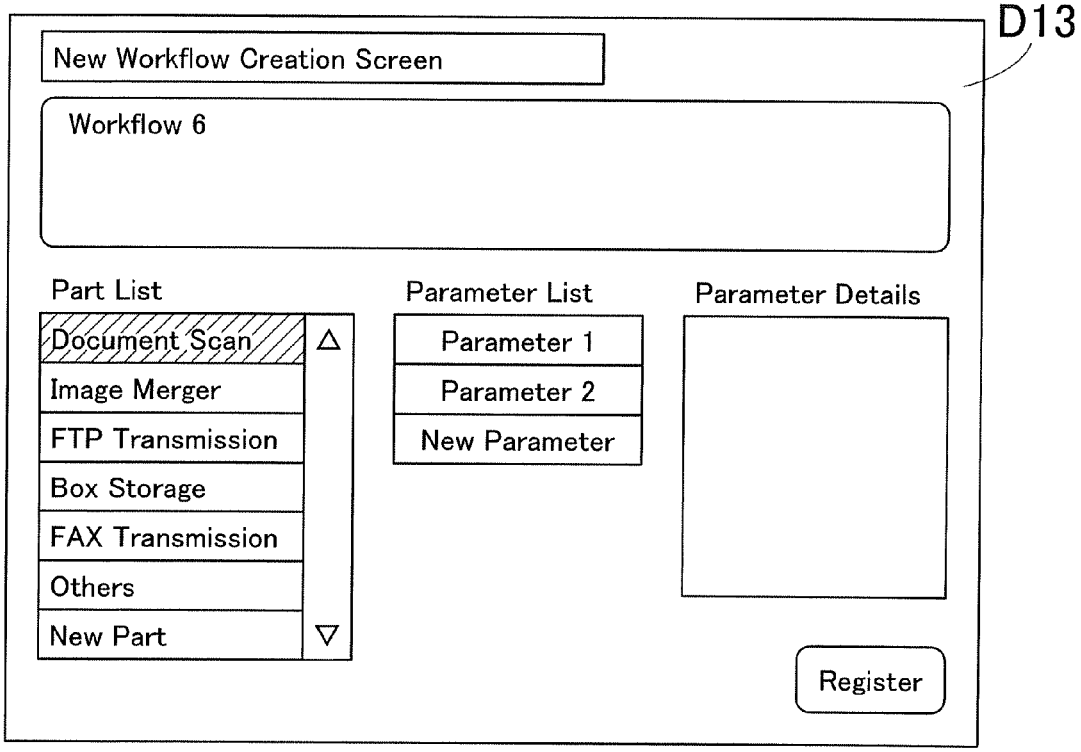
FIG. 10 is a diagram showing a post-part selection screen that follows the screen in FIG. 9.

If a user selects for example "document scan" in the "part list" in the part selection screen D12 by pressing the button, the screen is switched to a post-part selection screen D13 that is shown in FIG. 10. The buttons with hatching in Figures indicate those are already selected.

As shown in the post-part selection screen D13, there is a list of the parameters that are preliminarily registered for the part "document scan", displayed in the "parameter list".

Figure 11:
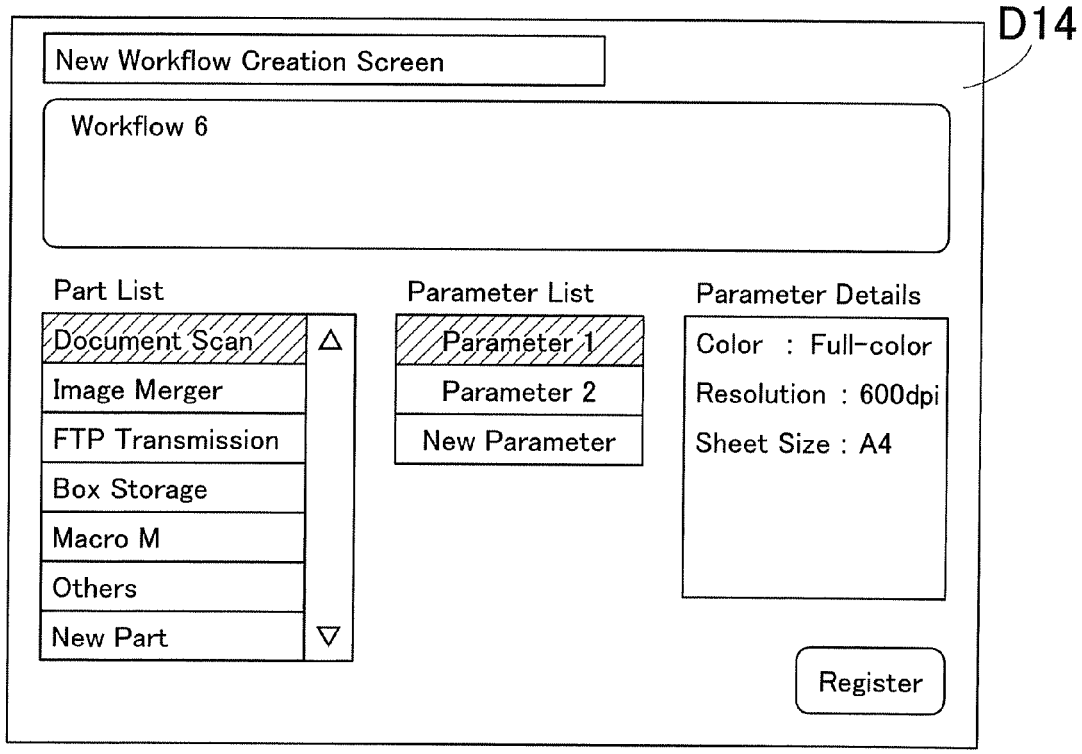
FIG. 11 is a diagram showing a post-parameter selection screen that follows the screen in FIG. 10.

If a user selects "parameter 1" in the post-part selection screen D13, the screen is switched to a post-parameter selection screen D14 that is shown in FIG. 11.

In the post-parameter selection screen D14, there are details (color, resolution and sheet size) of the parameter 1, displayed in the "parameter details".

If a "new" button listed in the "parameter list" is pressed in the post-parameter selection screen D14, a new parameter can be created. The new created parameter is stored and registered as one component of the same part (in this case, "document scan") in the HDD 108 by the CPU 101. More specifically, it is registered as a parameter 3 of the part "document scan". In this way, a new parameter (process condition) for a part that is already registered is registered as one component of the part, and parts with different parameters are not to be individually registered as different parts. Thus, this contributes to prevention of duplicated registration of parts, and the parameters can be efficiently registered.

If a user presses a "resister" button in the post-parameter selection screen D14, not only a new workflow that is composed of the part "document scan" is registered in the HDD 108, but also the screen is switched to a post-part setting screen D15.

As shown in the post-part setting screen D15, there is the part "document scan" displayed as the first component of the workflow.

Figure 13:
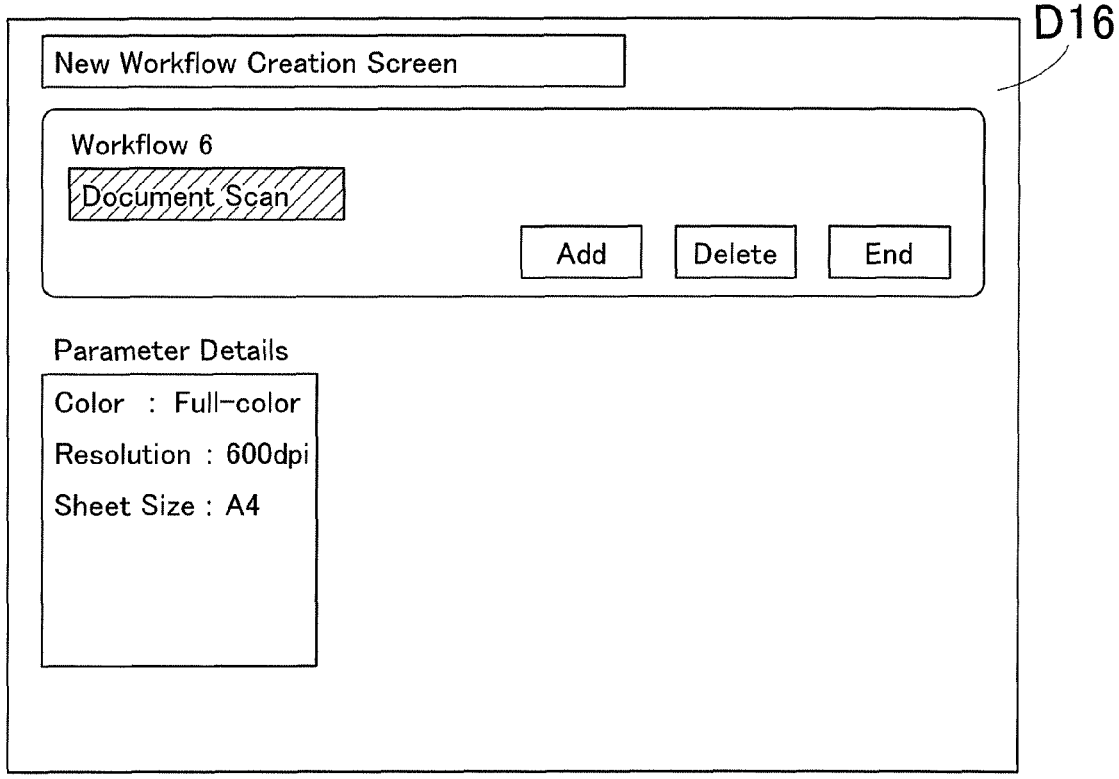
FIG. 13 is a diagram showing a part setting confirmation screen that follows the screen in FIG. 12.

If it is needed to confirm detailed setting of the part "document scan" the "document scan" button shown in the screen D15 is pressed, then the screen is switched to a part setting confirmation screen D16 that is shown in FIG. 13.

In the part setting confirmation screen D16, parameter details for the selected part are displayed.

Figure 14:
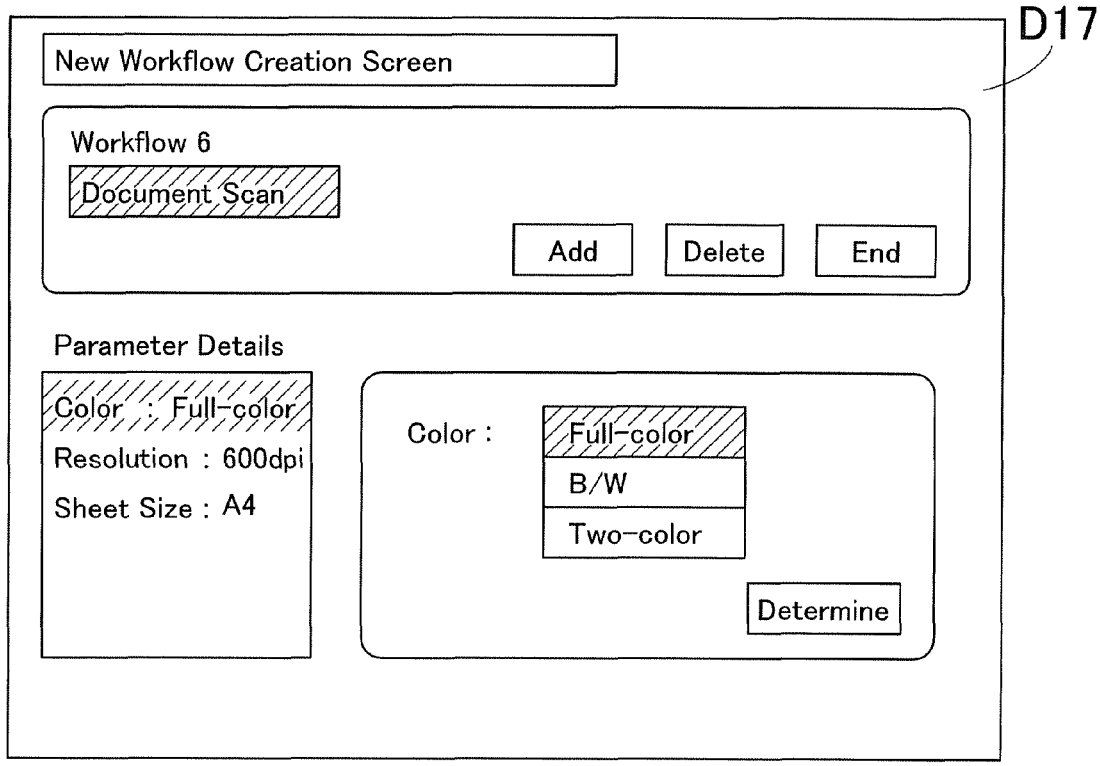
FIG. 14 is a diagram showing a parameter modification screen that follows the screen in FIG. 13.

If an item "color", "resolution", "sheet size" or others in the part setting confirmation screen D16 is selected, the screen is switched to a parameter modification screen D17 shown in the FIG. 14, and the parameter can be modified. In FIG. 14, the item "color" is intended to be modified.

Figure 12:
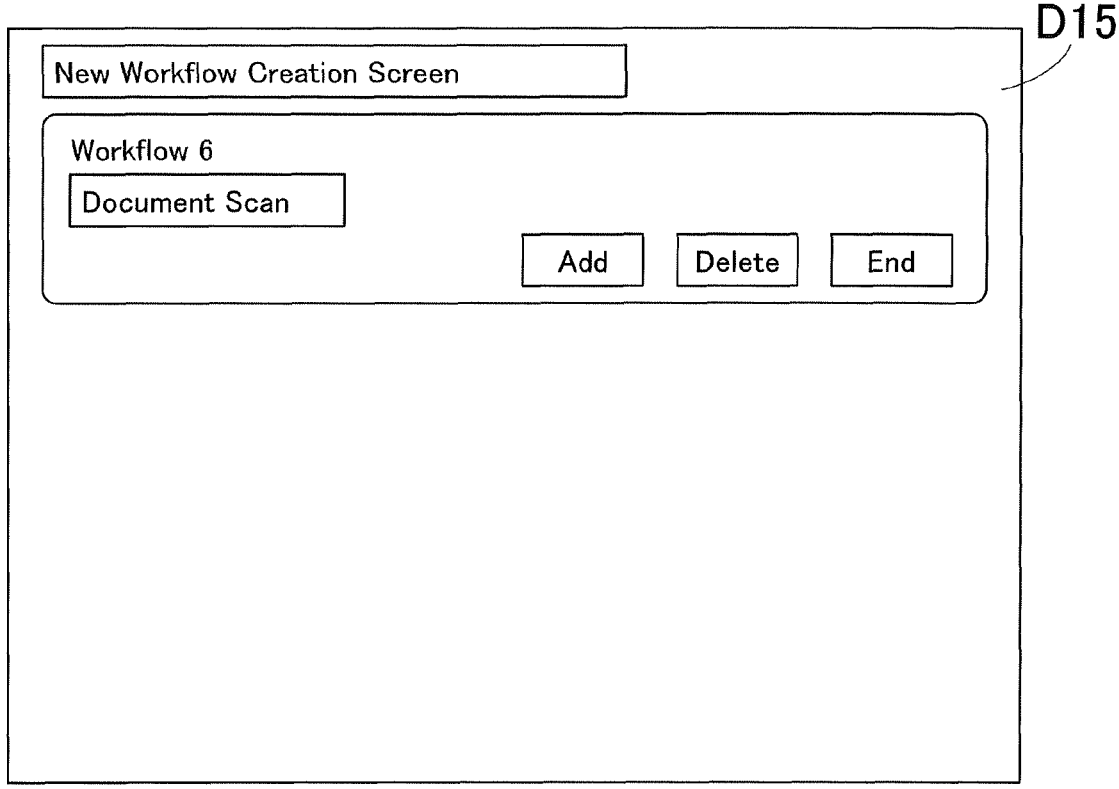
FIG. 12 is a diagram showing a post-part setting screen that follows the screen in FIG. 11.

If the part "document scan" that is already set is needed to be deleted in the post-part setting screen D15 shown in FIG. 12, the part can be deleted by pressing the "delete" button after selecting "document scan".

Figure 15:
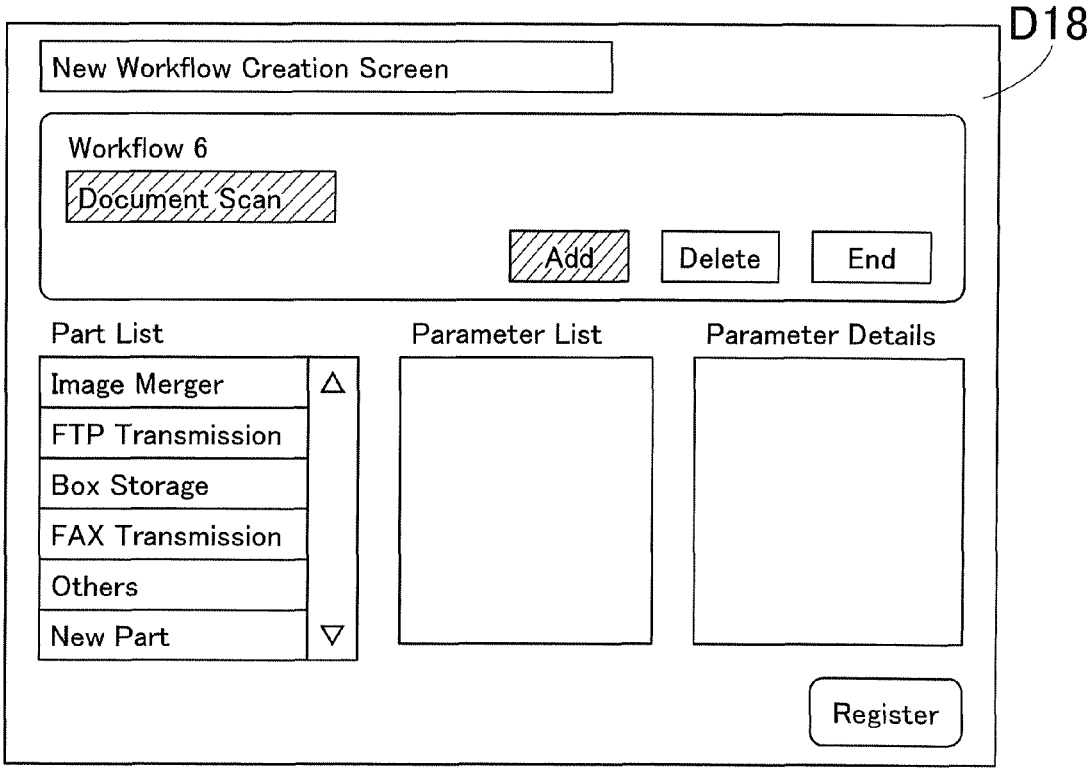
FIG. 15 is a diagram showing a part selection screen that follows the screen in FIG. 12.

In addition, if another part is needed to be added in the post-part setting screen D15 shown in FIG. 12, the screen is switched to a part selection screen D18 shown in FIG. 15, by pressing the "add" button.

In the part selection screen D18, there are buttons each having an indication that specifies a part such as "image merger", "FTP transmission", "Box storage", "FAX transmission", or a macro (not shown in Figure). A list of the parts and the macros is displayed in the order depending on the possibility of use (frequency of use) right after the part "document scan". To display in the order, relationships between parts and macros and those having been used right before the respective parts and macros are administered by the table shown in FIG. 16, and the listing priorities that is which parts will be more likely selected next are judged with reference to the table.

As shown in a table in FIG. 16, "image merger" for example, has been used twice in workflows as a part following "document scan", and "e-mail transmission" has been used also twice as a part following "SMB transmission". Thus, according to the table, those two parts are assumed to be of high priority.

Therefore, in the part selection screen D18 that is shown in FIG. 15, "image merger" is displayed at the top of the list as a candidate that follows "document scan".

As described above, when a new workflow is constructed, a list of buttons each having an indication that specifies one of a plurality of registered parts is displayed on the display. If one of the buttons is simply pressed by a user, a part corresponding to the indication is accepted as a component of the workflow by the CPU 101. In this way, users can construct new workflows easily and efficiently. In addition, since a list of buttons is displayed in the order of frequency of use of parts that correspond to the buttons, users can construct new workflows more easily and efficiently.

Figure 17:
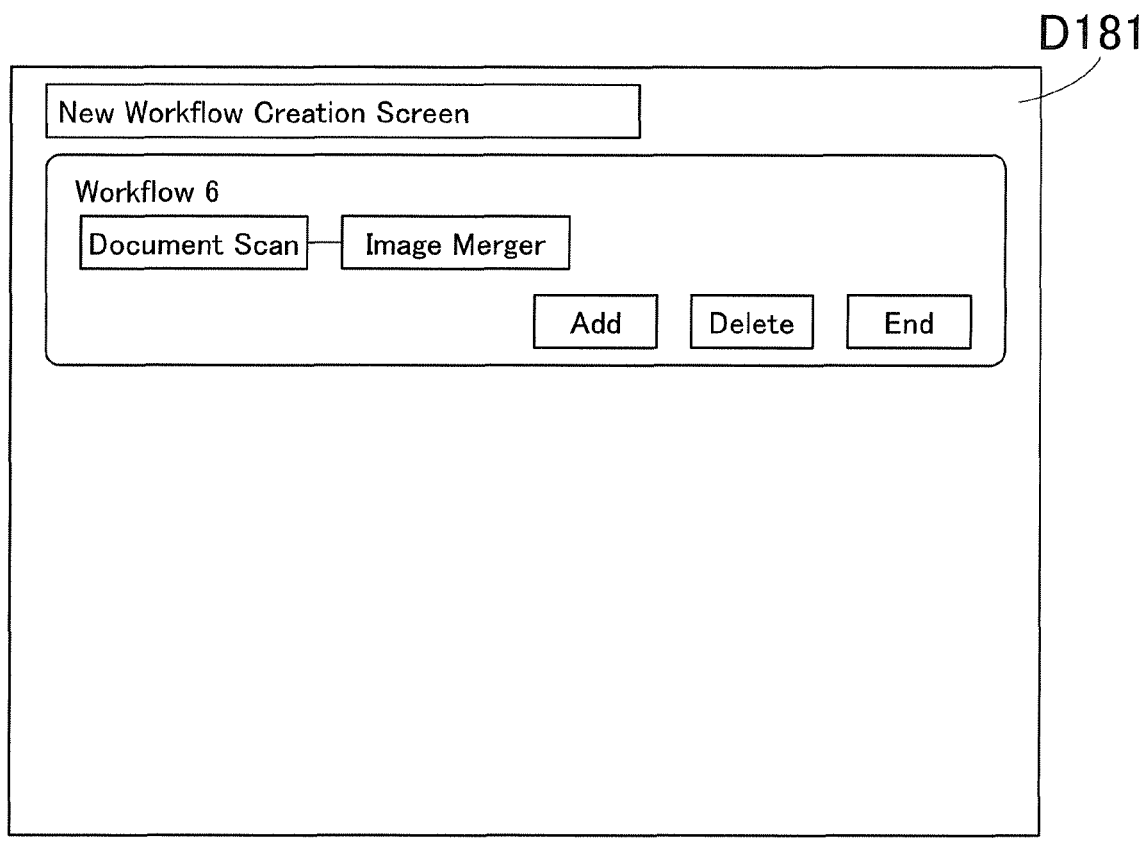
FIG. 17 is a diagram showing a post-part addition screen that follows the screen in FIG. 15.

After "document scan" is selected, if a user selects for example "image merger" and presses the "register" button, "image merger" is decided as a part following "document scan", and then the screen is switched to a post-part addition screen D181 that is shown in FIG. 17.

In the post-part addition screen D181, there is "image merger" displayed following "document scan" as the second component of the workflow.

Figure 18:
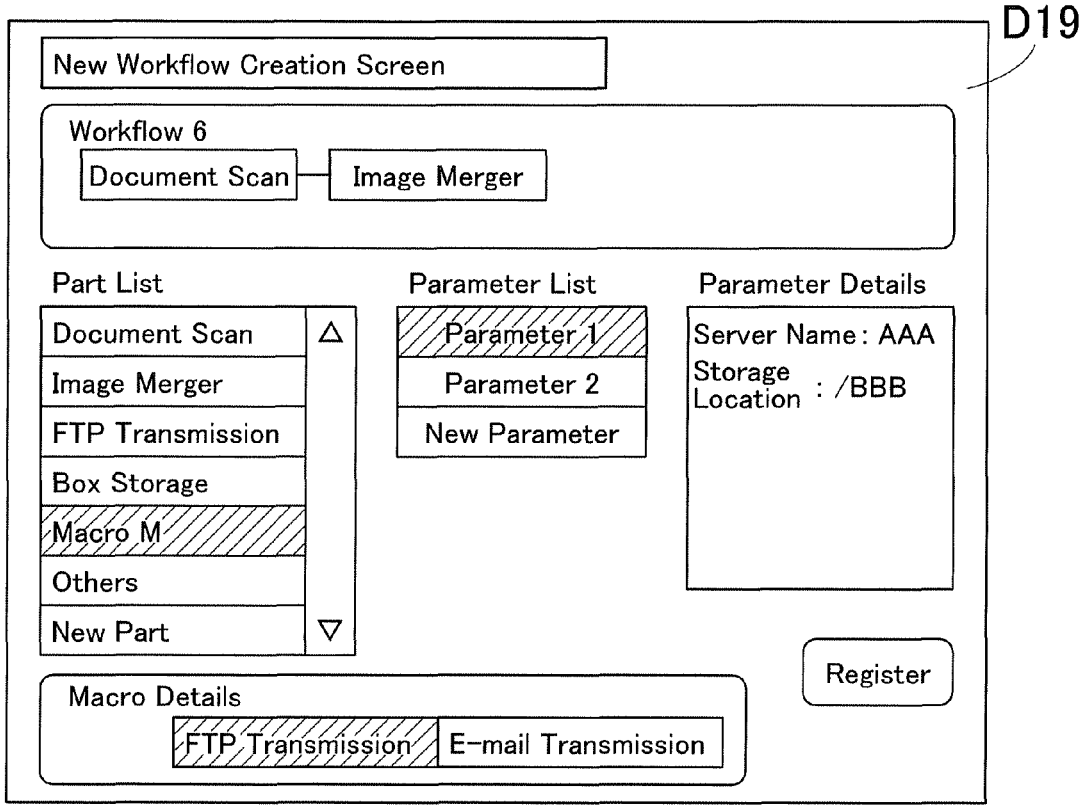
FIG. 18 is a diagram showing a part selection screen that follows the screen in FIG. 17.

Further in the post-part addition screen D181, if another part is needed to be added in the workflow, the screen is switched to a part selection screen D19 that is shown in FIG. 18, by pressing the "add" button.

In the part selection screen D19, there is a "macro M" button displayed together with the buttons of "document scan", "image merger", "FTP transmission" and "Box storage". If the "macro M" button is pressed in the part selection screen D19, details of "macro M" are displayed at the bottom of the display area. In the present embodiment, "macro M" is composed of "FTP transmission" and "e-mail transmission". If an "FTP transmission" button in the macro details field is pressed, a parameter list for "FTP transmission" and parameter details of a parameter that is selected in the parameter list are displayed.

Figure 19:
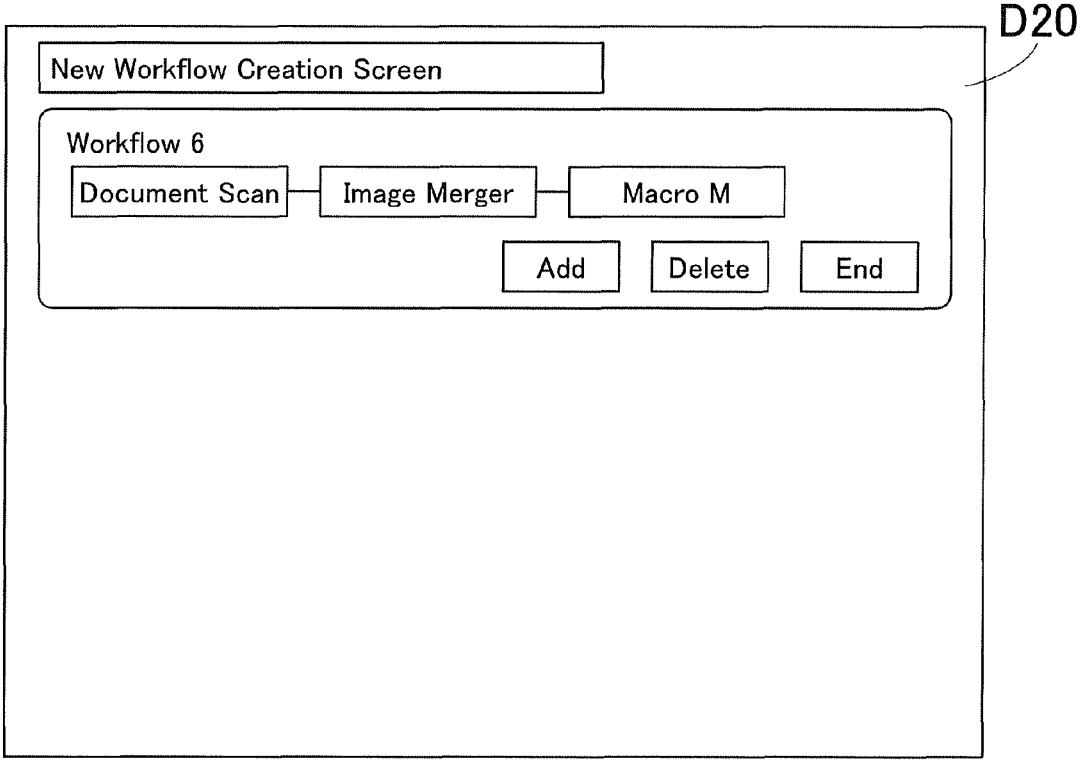
FIG. 19 is a diagram showing a post-part addition screen that follows the screen in FIG. 18.
Figure 20:
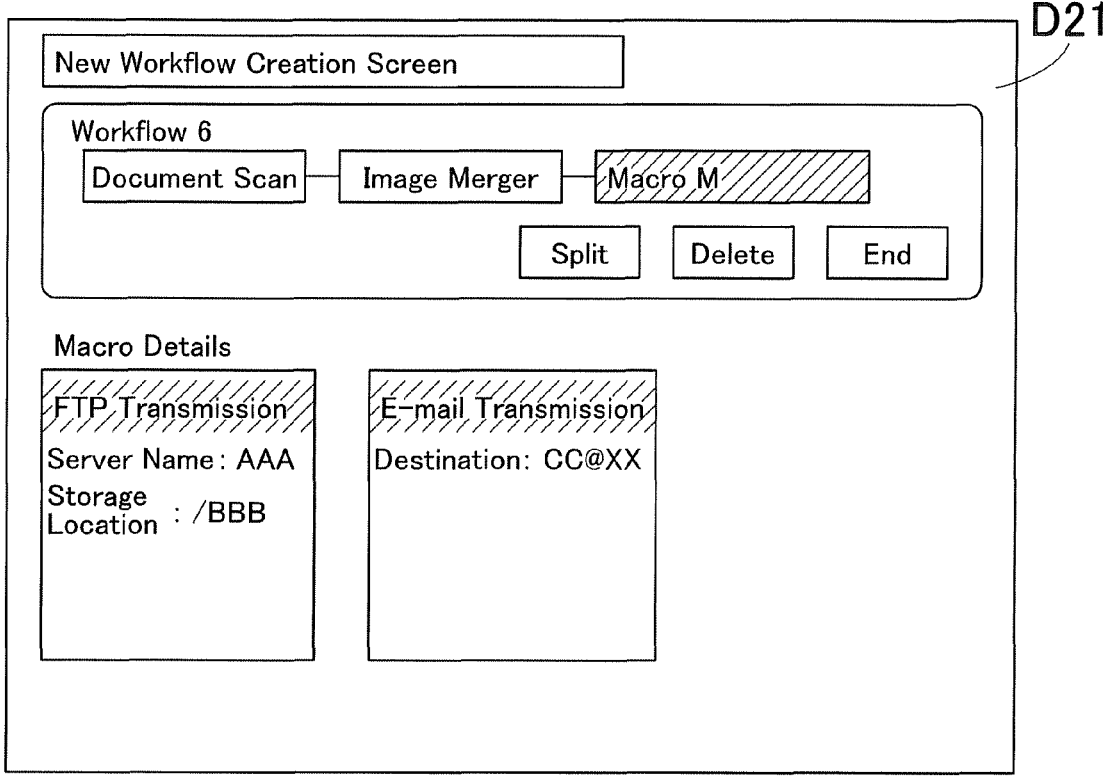
FIG. 20 is a diagram showing a macro details display screen that follows the screen in FIG. 19.

If a user presses the "register" button in the part selection screen D19, "macro M" is decided as a part following "document scan" and "image merger", and the workflow is modified and registered. At the same time, the screen is switched to a post-part addition screen D20 that is shown in FIG. 19.

In the post-part addition screen D20, there is "macro M" displayed next to "document scan" and "image merger", as the third component of the workflow. The workflow construction is terminated by pressing the "end" button, and the workflow is recorded in the HDD 108 as a new workflow. A series of processes is performed according to the new workflow, by calling out the workflow 6 and give an instruction to execute it using an operation screen.

If the "macro M" button is pressed in the post-part addition screen D20, the screen is switched to a macro details display screen D21, where there are not only parameter details displayed each for "FTP transmission" and "e-mail transmission" that are components of the macro, at the same time, but also a "split" button displayed in the workflow display field.

Figure 21:
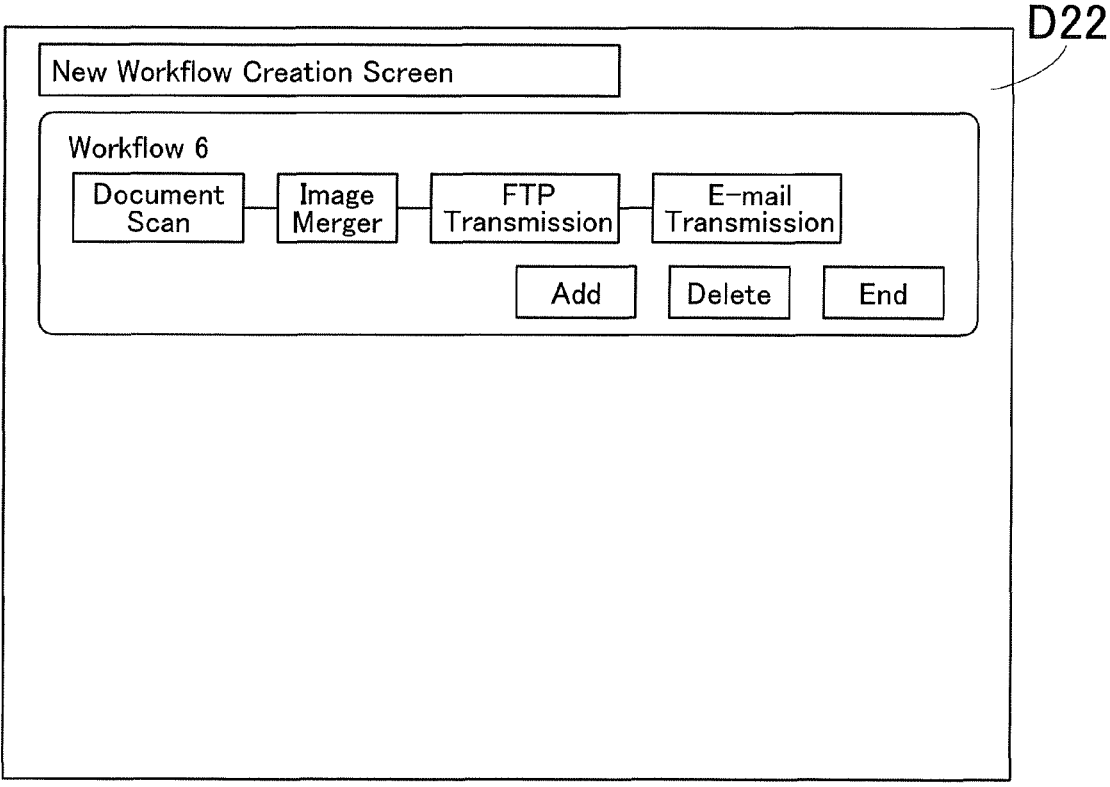
FIG. 21 is a diagram showing a split macro display screen that follows the screen in FIG. 20.

If the "split" button is pressed, the screen is switched to a macro split display screen D22 that is shown in FIG. 21.

In the macro split display screen D 22, single original parts into which the "macro M" is split are displayed.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A workflow construction apparatus, comprising:
a memory;
a unit process register to store and register settings of unit processes that are workflow components classified by functions, in said memory, each of the unit processes having one or more process conditions;
a constructer to construct a workflow by combining indications that each specifies one of said registered settings of unit processes, and wherein said constructer analyzes registered workflows to register a combination of a plurality of unit processes by one indication in said unit process register, and wherein said unit process register registers a process condition as one component of an already registered unit process, if a unit process is exactly the same as the already registered unit processes except for the process condition, and wherein said constructer automatically analyzes the registered workflows for each combination of two or more unit processes, and wherein each combination of two or more unit processes are automatically registered by one indication in said unit process register;
a workflow register to store and register said constructed workflow with the indications that specify said combination, in said memory; and
wherein said unit process register registers said combination of a plurality of the unit processes by one indication, if it is used in more than a predetermined number of workflows, based on an analysis of the registered workflows.

2. A workflow construction apparatus as recited in claim 1, comprising:
a display; and
a controller not only to make said display to display a list of indications each specifying one of a plurality of unit processes that are registered by the unit process register when a new workflow is constructed, but also to make a unit process corresponding to the selected indication accepted as a component of the workflow when one of the indications is selected by a user.

3. A workflow construction apparatus as recited in claim 2, wherein said controller controls to make a list of indications displayed in the order depending on frequency of use of unit processes corresponding to the indications.

4. A workflow construction apparatus as recited in claim 1, wherein said workflow is defined by the sequence of a plurality of said unit processes and the process conditions of the respective unit processes.

5. A workflow construction method performed in a computer, comprising:
a unit process registration step to store and register settings of unit processes that are workflow components classified by functions, in a memory, each of the unit processes having one or more process conditions;
a step to construct a workflow by combining indications that each specifies one of said registered settings of unit processes, and wherein said step to construct a workflow analyzes registered workflows to register a combination of a plurality of unit processes by one indication in said unit process register, and wherein a process condition is registered as one component of an already registered unit process, if a unit process is exactly the same as the already registered unit processes except for the process condition, and wherein said constructer automatically analyzes the registered workflows for each combination of two or more unit processes, and wherein each combination of two or more unit processes are automatically registered by one indication in said unit process register;

a step to store and register said constructed workflow with the indications that specify said combination, in the memory; and wherein in said unit process registration step, said combination of a plurality of the unit processes is registered by one indication, if it is used in more than a predetermined number of workflows, based on an analysis of the registered workflows.

6. A workflow construction method as recited in claim 5, comprising:

a displaying step to make a list of indications each specifying one of a plurality of unit processes that are registered by a unit process register displayed on a display, when a new workflow is constructed; and a controlling step to make a unit process corresponding to the selected indication accepted as a component of the workflow, when one of the indications is selected by a user.

7. A workflow construction method as recited in claim 6, comprising said displaying step, wherein a list of indications is displayed in the order depending on the frequency of use of unit processes corresponding to the indications.

8. A workflow construction method as recited in claim 5, wherein said workflow is defined by the sequence of a plurality of said unit processes and the process conditions of the respective unit processes.

9. A non-transitory recording medium recording a workflow construction program to make a computer execute:

a unit process registration step to store and register settings of unit processes that are workflow components classified by functions, in a memory, each of the unit processes having one or more process conditions;

a step to construct a workflow by combining indications that each specifies one of said registered settings of unit processes, and wherein said step to construct a workflow analyzes registered workflows to register a combination of a plurality of unit processes by one indication in said unit process register, wherein a process condition is registered as one component of an already registered unit process, if a unit process is exactly the same as the already registered unit processes except for the process condition, and wherein said constructer automatically analyzes the registered workflows for each combination of two or more unit processes, and wherein each combination of two or more unit processes are automatically registered by one indication in said unit process register;

a step to store and register said constructed workflow with the indications that specify said combination, in a memory; and recording said program that makes a computer execute said unit process recording step, wherein said combination of a plurality of the unit processes is registered by one indication, if it is used in more than a predetermined number of workflows, based on an analysis of the registered workflows.

10. A non-transitory recording medium as recited in claim 9, recording said program that makes a computer execute:

a displaying step to make a list of indications each specifying one of a plurality of registered unit processes displayed on a display, when a new workflow is constructed; and a controlling step to make a unit process corresponding to the selected indication accepted as a component of the workflow, when one of the indications is selected by a user.

11. A non-transitory recording medium as recited in claim 10, recording said program that makes a computer execute said displaying step, wherein a list of indications is displayed in the order depending on frequency of use of unit processes corresponding to the indications.

12. A non-transitory recording medium as recited in claim 9, recording said program that makes a computer define said workflow by the sequence of said unit processes and the process conditions of the respective unit processes.

13. A workflow construction apparatus as recited in claim 1, wherein the plurality of unit processes include two or more of the following: a document scan, an image readout, an image merger, a FTP transmission, an e-mail transmission, and a FAX transmission.

14. A workflow construction method as recited in claim 5, wherein the plurality of unit processes include two or more of the following: a document scan, an image readout, an image merger, a FTP transmission, an e-mail transmission, and a FAX transmission.

15. A non-transitory recording medium as recited in claim 9, wherein the plurality of unit processes include two or more of the following: a document scan, an image readout, an image merger, a FTP transmission, an e-mail transmission, and a FAX transmission.

* * * * *